United States Patent
Kwok et al.

(10) Patent No.: US 11,019,633 B2
(45) Date of Patent: May 25, 2021

(54) SELECTION OF FREQUENCY BAND FOR USER EQUIPMENT BY RADIO ACCESS NETWORK

(71) Applicant: T-Mobile USA, Inc., Bellevue, WA (US)

(72) Inventors: Ming Shan Kwok, Seattle, WA (US); Jun Liu, Issaquah, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/576,559

(22) Filed: Sep. 19, 2019

(65) Prior Publication Data
US 2020/0337054 A1    Oct. 22, 2020

Related U.S. Application Data

(60) Provisional application No. 62/836,510, filed on Apr. 19, 2019.

(51) Int. Cl.
H04W 72/04     (2009.01)
H04W 76/15     (2018.01)
H04W 76/27     (2018.01)

(52) U.S. Cl.
CPC ... H04W 72/0486 (2013.01); H04W 72/0453 (2013.01); H04W 76/15 (2018.02); H04W 76/27 (2018.02)

(58) Field of Classification Search
None
See application file for complete search history.

(56) References Cited

U.S. PATENT DOCUMENTS

| | | | |
|---|---|---|---|
| 8,918,102 B2* | 12/2014 | Wang | H04B 17/327 |
| | | | 455/435.2 |
| 2017/0265121 A1* | 9/2017 | Barberis | H04W 48/08 |
| 2017/0347277 A1 | 11/2017 | Zhang et al. | |
| 2018/0124687 A1 | 5/2018 | Park et al. | |
| 2019/0174320 A1* | 6/2019 | Kodaypak | H04L 41/12 |
| 2020/0029377 A1* | 1/2020 | Chow | H04W 24/08 |

OTHER PUBLICATIONS

Extended Euroepan Search Report dated Jul. 28, 2020, for European Application No. 20168294.5, 11 pages.
Intel Corporation, "Routing restriction and security for aggregation within NR", GPP Draft; Oct. 2016, 3 pages.

* cited by examiner

*Primary Examiner* — Anh Ngoc M Nguyen
(74) *Attorney, Agent, or Firm* — Lee & Hayes, P.C.

(57) ABSTRACT

After a user equipment (UE) selects, out of multiple supported frequency bands, an anchor layer to use to camp on a base station of a telecommunication network, the base station can select a new anchor layer for the UE. The base station can use information about itself, neighboring base stations, and/or the UE to determine which anchor layer would best allow the UE to achieve an experience goal, such as a highest throughput, lowest latency, highest coverage availability, or other goal.

18 Claims, 7 Drawing Sheets

SELECTION OF FREQUENCY BAND FOR USER EQUIPMENT BY RADIO ACCESS NETWORK

RELATED APPLICATIONS

This U.S. patent application claims priority to U.S. Provisional Patent Application No. 62/836,510, entitled "INTELLIGENT DEVICE HANDLING ON 5G LAYER MANAGEMENT," filed on Apr. 19, 2019, the entirety of which is incorporated herein by reference.

BACKGROUND

When a user equipment (UE) begins to search for a connection to a telecommunication network, for instance when the UE first powers on, the UE can scan frequencies in one or more supported frequency bands to discover cells that are using those frequencies. When a discovered cell meets certain cell selection criteria, the UE can consider the cell to be a suitable cell. The UE can also select a cell, and can camp on a selected cell using an associated frequency.

In some examples, a UE and/or base stations of the telecommunication network can support multiple bands of frequencies. However, when a UE selects a cell operated by a base station, the UE can camp on the cell using a particular frequency band of those multiple supported frequency bands. The frequency band that a UE uses to camp on a cell can be known as an anchor layer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Base stations of a telecommunication network may be able to use frequencies in multiple bands to communicate with user equipment (UE). These bands can include low band frequencies under 1 GHz, mid-band frequencies between 1 GHz and 6 GHz, and high band frequencies above 6 GHz, including millimeter wave (mmW) frequencies above 24 GHz.

As an example, Long-Term Evolution (LTE) spectrum can include multiple standardized frequency bands, including the following low bands and mid-bands:

| Band | Shorthand Frequency (MHz) | Uplink Band (MHz) | Downlink Band (MHz) |
|---|---|---|---|
| B2 (Mid-Band) | 1900 | 1850-1910 | 1930-1990 |
| B12 (Low Band) | 700 | 699-716 | 729-746 |
| B25 (Mid-Band) | 1900 | 1850-1915 | 1930-1995 |
| B41 (Mid-Band) | 2500 | 2496-2690 | 2496-2690 |
| B66 (Mid-Band) | 1700 | 1710-1780 | 2110-2200 |
| B71 (Low Band) | 600 | 663-698 | 617-652 |

Fifth generation (5G) New Radio (NR) spectrum can include similar low bands and mid-bands, as well as bands at higher frequencies including mmW bands. For example, 5G NR spectrum can include the following standardized low bands, mid-bands, and mmW bands:

| Band | Shorthand Frequency (MHz) | Uplink Band (MHz) | Downlink Band (MHz) |
|---|---|---|---|
| n2 (Mid-Band) | 1900 | 1850-1910 | 1930-1990 |
| n12 (Low Band) | 700 | 699-716 | 729-746 |
| n25 (Mid-Band) | 1900 | 1850-1915 | 1930-1995 |
| n41 (Mid-Band) | 2500 | 2496-2690 | 2496-2690 |
| n66 (Mid-Band) | 1700 | 1710-1780 | 2110-2200 |
| n71 (Low Band) | 600 | 663-698 | 617-652 |
| n260 (mmW) | 39000 (39 GHz) | 37000-40000 | 37000-40000 |
| n261 (mmW) | 28000 (28 GHz) | 27500-28350 | 27500-28350 |

In some examples, 5G NR frequencies below 6 GHz can be considered to belong to Frequency Range 1 (FR1). 5G NR frequencies in the mmW range, such as frequencies between 20 GHz and 60 GHz, can be considered to belong to Frequency Range 2 (FR2).

Frequencies in different bands may have different benefits and drawbacks. For example, lower-frequency signals can often propagate over larger distances than higher-frequency signals, and may be able to better penetrate through objects than higher-frequency signals. However, in many cases, higher-frequency signals can be used to transmit data more quickly than lower-frequency signals.

When a UE attempts to connect to a telecommunication network, for instance when the UE powers on, the UE can search through frequencies of supported bands to locate frequencies that base stations are using to operate cells. The UE can take measurements, such as signal strength measurements, associated with scanned frequencies. The UE can also decode signals broadcasted on such frequencies to identify public land mobile networks (PLMNs) associated with the base stations. If a signal for a cell operated by a base station meets cell selection criteria, for instance if the signal meets signal strength thresholds and the base station's PLMN is a home PLMN for the UE or is another PLMN that the UE is authorized to access, the UE can identify the cell as being a suitable cell. The UE can select a cell, such as a cell it has identified as being a suitable cell, and can camp on the selected cell using a corresponding frequency.

When a UE supports multiple frequency bands, there may be multiple candidate frequency bands that the UE can potentially use to camp on a cell. The specific frequency band that the UE selects from such candidate frequency bands and uses to camp on a cell can be known as an anchor layer. In some examples, a UE can be capable of establishing dual connections to more than one cell or base station using different frequencies bands. For instance, a UE may camp on a first cell using an anchor layer, and use that anchor layer in a dual connection for a first leg of a split bearer. However, the UE may also use a different frequency band to establish a second leg of the split bearer with a second cell.

In some systems, UEs can be configured to use predefined and static priorities associated with possible candidate frequency bands when selecting an anchor layer to camp on. For example, a telecommunication network, a vendor, a manufacturer, or other entity may provide a UE with static selection rules or a predefined priority list of frequency bands that prioritize selection of certain frequency bands over other frequency bands. For instance, predefined priority data may assign higher priority levels to bands associated with higher frequencies and lower priority levels to bands with lower frequencies, as higher frequencies may often provide higher throughput than lower frequencies.

As an example, a base station may support connections on a B12 700 MHz low-band, a B2 1900 MHz mid-band, and a B41 2500 MHz mid-band. If a UE 102 also supports those three bands, in some systems the UE 102 may be configured with a static priority list that assigns a highest priority level to the B41 2500 MHz mid-band, a middle priority level to the B2 1900 MHz mid-band, and a lowest priority level to the B12 700 MHz low-band. Accordingly, even if the UE 102 could identify the base station as being associated with a suitable cell on frequencies in all three of these bands, in these systems the UE 102 would use the static priority list to identify the B41 2500 MHz mid-band as the highest priority band, and therefore select and camp on the B41 band as an anchor layer.

However, there can be situations in which using preset and static priorities to select an anchor layer from available candidate frequency bands may provide a UE with a lesser experience than if another anchor layer had been selected. For example, in some implementations, a UE that uses the B41 band as an anchor layer to camp on a cell operated by an LTE base station may be restricted to only being able to use a corresponding n41 band in a second leg of a split bearer in a dual connection when the UE is also connected to a 5G base station. However, other bands, such as a B2 or B66 band, may not be subject to similar restrictions that limit what other bands can be used in a second leg of a dual connectivity arrangement. Selecting one of these other bands as an anchor layer may provide a UE 102 with more flexibility about what band it can use as a second leg during a dual connection. For instance, if a UE uses a B2 band as an anchor layer to an LTE base station, the UE 102 may have the option of also using an n260 or n261 mmW band, an n41 mid-band, an n2 or n66 mid-band, or an n12 or n71 low-band to dual-connect to a 5G base station.

Accordingly, although some systems would always steer UEs to select the B41 band as an anchor layer when the B41 band is available and predefined priority data assigns the highest priority to the B41 band among available bands, there are situations when selecting another band as an anchor layer can provide a UE with a better experience even if the other band would have had a lower priority in predefined priority data. For example, as discussed above, using the B41 band as an anchor layer may restrict a UE to only being able to use a combination of the B41 band and the n41 band in a dual connectivity arrangement. However, if the UE is close enough to a 5G base station to connect using a high-throughput mmW band in a second leg of a dual connectivity arrangement, camping on an LTE base station using the B2 band or another band as an anchor layer may result in greater throughput to the UE overall. For instance, a combined throughput associated with using a B2 band+ mmW band combination may be higher than a combined throughput associated with using a B41 band+n41 band combination, even if the B41 band alone would provide a higher throughput than the B2 band. As such, in this example, selecting the B2 band as the anchor layer instead of the B41 band may provide an improved experience overall, because selecting B2 as the anchor layer allows the UE to also connect using the mmW band simultaneously and thereby achieve a higher throughput overall. However, in other situations when a high-throughput mmW band is not available to a UE, the UE may be able to achieve the highest throughput using the B41 band as the anchor layer.

Additionally, in some systems, once a UE has selected a frequency band to use as an anchor layer, the UE may remain camped on that anchor layer as long as the UE can continue to connect to a base station using that anchor layer. For instance, if a UE was initially in a location where the B66 band was the highest priority band available and thus selected the B66 band as the anchor layer to camp on, in many systems the UE may continue to use the B66 band as an anchor layer even if the UE has moved to a location where the B41 band could provide an improved experience if the UE were to camp on the B41 band as an anchor layer. In some examples, a UE may perform a cell reselection process by which it evaluates potential connections to other cells and may switch to camping on a different cell if that cell is associated with a higher priority level or has stronger signal strength measurements. However, some UEs may be limited to searching for cells that are using the same frequency band as a currently selected anchor layer during cell reselection processes, such that these UEs may not consider camping on an entirely different frequency band as an anchor layer instead of just camping on a different cell using the same frequency band as the current anchor layer.

Described herein are systems and methods by which a base station can determine an anchor layer for a UE. The base station can use information about itself, neighboring base stations, and/or a UE to select an anchor layer for the UE that can, in some situations, improve an experience for the UE relative to the UE selecting an anchor layer itself based on predefined and/or static priority data.

Example Environment

Figure 1:
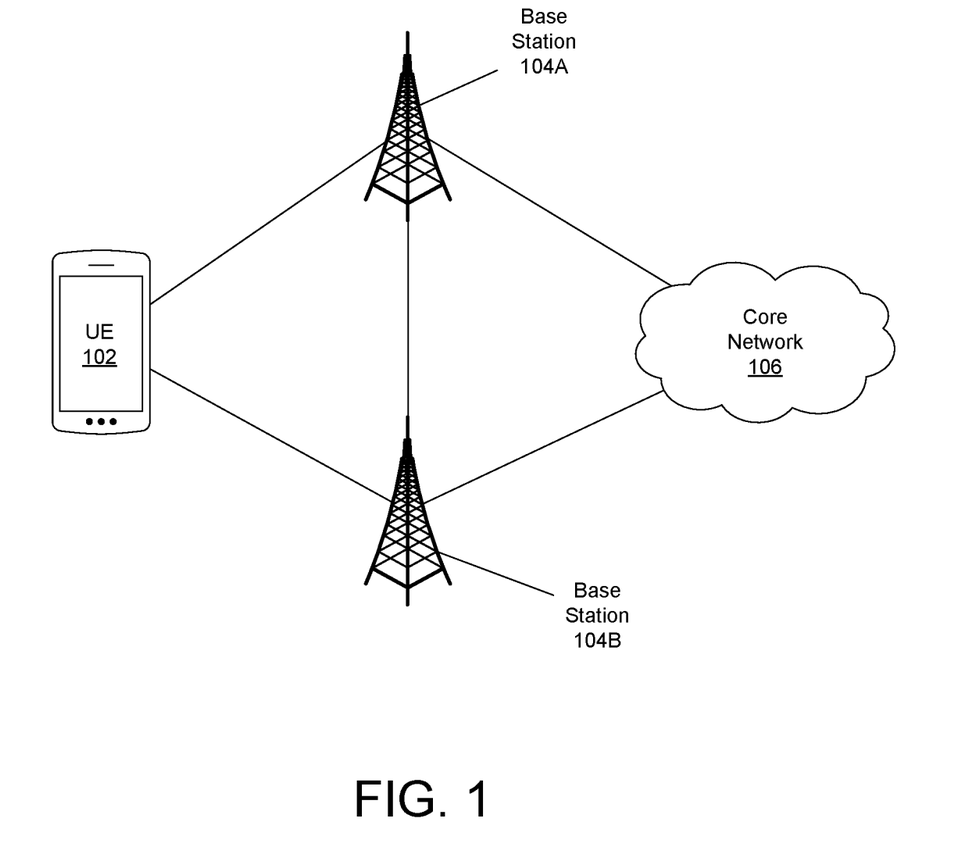
FIG. 1 depicts an example network environment in which a user equipment (UE) can connect to one or more base stations of a telecommunication network.

FIG. 1 depicts an example network environment in which a user equipment (UE) 102 can connect to one or more base stations 104 of a telecommunication network to engage in communication sessions for voice calls, video calls, messaging, data transfers, or other types of communications. A UE 102 can be any device that can wirelessly connect to the telecommunication network. For example, a UE 102 can be a mobile phone, such as a smart phone or other cellular phone, a personal digital assistant (PDA), a personal computer (PC) such as a laptop, desktop, or workstation, a media player, a tablet, a gaming device, a smart watch, a hotspot, an Internet of Things (IoT) device, such as a sensor or a smart appliance, or any other type of computing or communication device. An example system architecture for a UE 102 is illustrated in greater detail in FIG. 5, and is described in detail below with reference to that figure.

A base station 104 can be an access point of a radio access network (RAN) of the telecommunication network. The base station 104 can be linked to a core network 106. The core network 106 may itself be linked to other networks, including an Internet Protocol (IP) Multimedia Subsystem (IMS), the Internet, and/or other networks. An example system architecture for a base station 104 is illustrated in greater detail in FIG. 4, and is described in detail below with reference to that figure.

A UE 102 can wirelessly connect to one or more base stations 104, which can in turn connect the UE 102 to a core network 106 and/or other networks. Connections between a UE 102 and a base station 104 can be based on one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, and/or any other previous or future generation of radio access technology.

A base station 104 of an LTE RAN can be referred to as an Evolved Node B (eNB). An LTE RAN can also be referred to as an Evolved Universal Mobile Telecommunications System (UMTS) Terrestrial Radio Access Network (E-UTRAN). A base station 104 of a 5G RAN can be referred to as a gNB. A 5G RAN can also be referred to as a 5G New Radio (NR) RAN.

In some examples, a UE 102 can be configured to connect to one base station 104 at a time. However, in other examples, a UE 102 can be capable of connecting to one or more base stations 104 at a time. For instance, when a UE 102 is compatible with both 5G and LTE protocols, the UE 102 can be capable of connecting to both a 5G gNB and an LTE eNB simultaneously, in a dual connectivity arrangement known as an E-UTRAN New Radio—Dual Connectivity (EN-DC) arrangement. In some examples, an EN-DC arrangement can enable a UE 102 to access 5G services using a non-standalone (NSA) connection in which an LTE eNB handles control plane data for the UE 102, while a 5G gNB handles user plane data for the UE 102. In other examples, a UE 102 can access 5G services using a stand-alone connection in which the UE 102 is connected to one or more 5G gNBs and is not connected to any LTE eNBs. In some examples, a UE 102 can instead be connected to multiple LTE eNBs and/or be connected to the same LTE eNB using different carriers associated with different frequencies. For instance, carrier aggregation techniques can allow a UE 102 to connect to an LTE eNB using different carriers on different frequencies to increase the overall bandwidth available to the UE 102.

Figure 2:
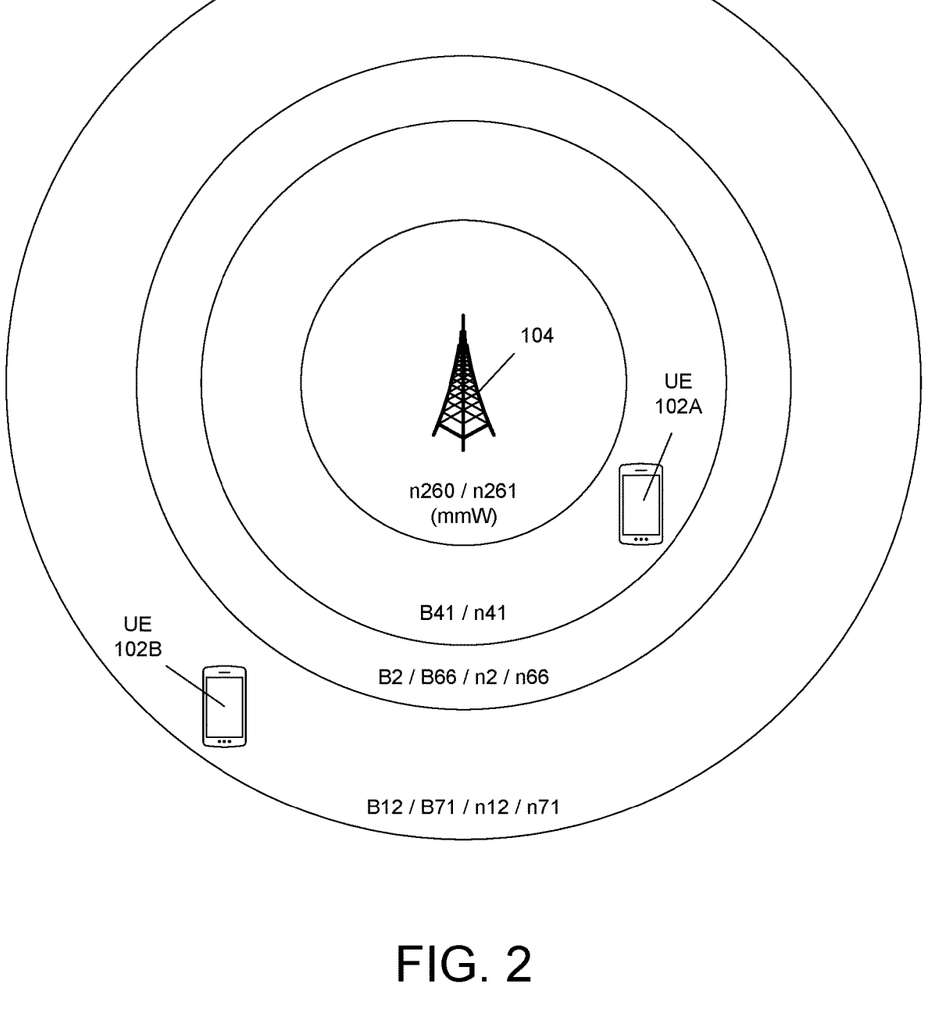
FIG. 2 depicts an example of frequency bands that a base station and/or a UE can support.

FIG. 2 depicts an example of frequency bands that a base station 104 and/or a UE 102 can support. Base stations 104 can be configured to use frequencies in one or more bands to communicate with UEs 102, including include low-bands with frequencies under 1 GHz, mid-bands with frequencies between 1 GHz and 6 GHz, and/or high-bands with frequencies above 6 GHz. High-band frequencies can include millimeter wave (mmW) bands with frequencies above 24 GHz. For example, an LTE eNB may operate cells using frequencies in a B12 or B71 low band, frequencies in a B2 or B66 mid-band, frequencies in a B41 mid-band, and/or frequencies in other low bands and/or mid-bands. As another example, a 5G gNB may operate cells using the same or similar frequencies in an n12 or n71 low band, an n2 or n66 mid-band, an n41 mid-band, and/or other low bands and/or mid-bands. However, a 5G gNB may also be configured to use frequencies in a larger spectrum range than an LTE eNB, including frequencies in one or more mmW bands. For example, a 5G gNB may be configured to also, or alternately, operate cells using frequencies in an n260 or n261 mmW band, and/or frequencies in other high-bands and mmW bands.

As shown in the example of FIG. 2, because signals sent at different frequencies may propagate over different distances, cells using some frequency bands can have different coverage areas that extend over different distances than other frequency bands. For instance, a first cell using a 28 GHz or 39 GHz mmW band, such as n260 or n261, may cover a relatively small first area. A second cell using a 2500 MHz mid-band, such as B41 or n41, may cover a second area that is larger than the first area. A third cell using a 1700 MHz or 1900 MHz mid-band, such as B2, B66, n2, or n66, may cover a third area that is larger than the second area. A fourth cell using a 600 MHz or 700 MHz low band, such as B12, B71, n12, or n71, may cover a fourth area that is larger than the third area.

Accordingly, in some cases, a UE 102 may be able to connect to a base station 104 using frequencies in more than one frequency band. For instance, if the base station 104 shown in FIG. 2 supports the B41 mid-band, the B2 mid-band, and the B12 low band, and those bands have different ranges, a first UE 102A may be close enough to the base station 104 to connect to the base station 104 using any one of the B41 mid-band, the B2 mid-band, and the B12 low band. However, if a second UE 102B is farther away from the base station 104 as shown in FIG. 2, the second UE 102B may only be able to connect to the base station 104 using frequencies in the B12 low band.

If a UE 102 is near multiple base stations 104, the UE 102 may be able to connect to one or more of those base stations 104 using one or more candidate frequency bands. For example, if UE 102B is only able to connect to the base station 104 shown in the example of FIG. 2 using the B12 low band, but a second base station 104 is closer to UE 102B, UE 102B may be able to instead, or additionally, connect to the second base station 104 using a mid-band or high band supported by the second base station 104 and UE 102B.

When a UE 102 initially attempts to connect to the telecommunication network, for instance upon powering up, the UE 102 can scan through frequencies in bands that the UE 102 supports in an attempt to find signals from base stations 104 that are broadcasting using those frequencies. When the UE 102 finds a signal on a supported frequency, the UE can measure a signal strength and/or determine other signal quality metrics. The UE 102 can also decode each signal to find an identifier of a public land mobile network (PLMN) associated with a base station 104. The UE 102 can determine that a cell operated by base station 104 is a suitable cell if it meets cell selection criteria, such as if the cell's signals meet signal strength thresholds and the cell is associated with an acceptable PLMN. The UE 102 can use this process to discover one or more cells, select one of the discovered cells, and camp on the selected cell using a frequency associated with the selected cell.

In some examples, a UE 102 can be in either a Radio Resource Control (RRC) idle state (RRC_IDLE) or an RRC connected state (RRC_CONNECTED). When the UE 102 is searching for a cell during a cell selection process, evaluating whether it should switch to a new cell during a cell reselection process, and/or is camped on a selected cell without being in active communications with a base station 104, the UE 102 can be in an RRC idle state. However, when the UE 102 is actively sending or receiving data through the telecommunication network via a base station 104, for instance when the UE is engaged in a call or another type of communication session, the UE 102 can be in an RRC connected state. A UE 102 can accordingly move between the RRC idle state and the RRC connected state based on its activities and/or whether the UE 102 is currently engaged in a communication session.

For example, when a UE 102 first powers on, finds and selects a cell of a base station 104, and camps on the cell, the UE 102 can be in the RRC idle state. If the UE 102 attempts to initiate a communication session or receives a paging message indicating that the UE 102 should join a communication session, the UE 102 can send an RRC connection request message to the base station 104. The base station 104 can respond with an RRC connection setup message, and the UE 102 can in turn respond with an RRC connection setup complete message and move to the RRC connected state. Radio bearers, including default and dedicated bearers, can also be set up in the telecommunication network for the UE 102 via the base station 104. The base station 104 can send information about such bearers to the UE 102 in an RRC reconfiguration message, and the UE 102 can respond with an RRC reconfiguration complete message. At this point the UE 102 can be in the RRC connected state and can engage in the communication session through the base station 104. When a communication session ends, the base station 104 can send an RRC connection release message to the UE 102. Any radio bearers or other resources that had been set up at the base station 104 or other portions of the telecommunication network for the communication session can be released. The UE 102 can reply with an RRC connection release complete message, and can return to the RRC idle state.

As discussed above, a UE 102 may support multiple frequency bands. Accordingly, a UE 102 may discover different cells operated by a base station 104, or multiple nearby base stations 104, that are each associated with different frequency bands supported by the UE 102. Accordingly, the UE 102 can select which specific frequency band the UE 102 should use to camp on a selected cell. The particular frequency band that the UE 102 uses to camp on a selected cell can be known as an anchor layer. In some examples, the UE 102 may be configured to initially select an anchor layer to use to camp on a cell, for instance by selecting between frequency bands of available cells based on predefined priorities associated with supported frequency bands that have been provided by the telecommunication network or another entity.

However, after the UE 102 attaches to a cell operated by a base station 104 using an anchor layer chosen by the UE 102, the base station 104 can evaluate data about the base station 104 itself, neighboring base stations 104, and/or the UE 102 to determine if the UE 102 should switch to camping on a different anchor layer that the base station 104 predicts will provide the UE 102 with an improved experience relative to an experience provided by the current anchor layer. For example, the base station 104 can predict that another anchor layer will provide an improved throughput to the UE 102, a lower latency for the UE 102, a better coverage area for the UE 102, a more consistent connection for the UE 102, and/or have other benefits for the UE 102 that would reflect an improved experience for the UE 102. When the base station 104 determines that a different anchor layer would provide an improved experience for a UE 102, the base station 104 can instruct the UE 102 to camp on that different anchor layer instead of the current anchor layer. As will be discussed further below, the base station 104 can instruct the UE 102 to camp on a particular anchor layer while the UE 102 is in an RRC connected state, or when the UE 102 is leaving an RRC connected state and is returning to an RRC idle state.

Figure 3:
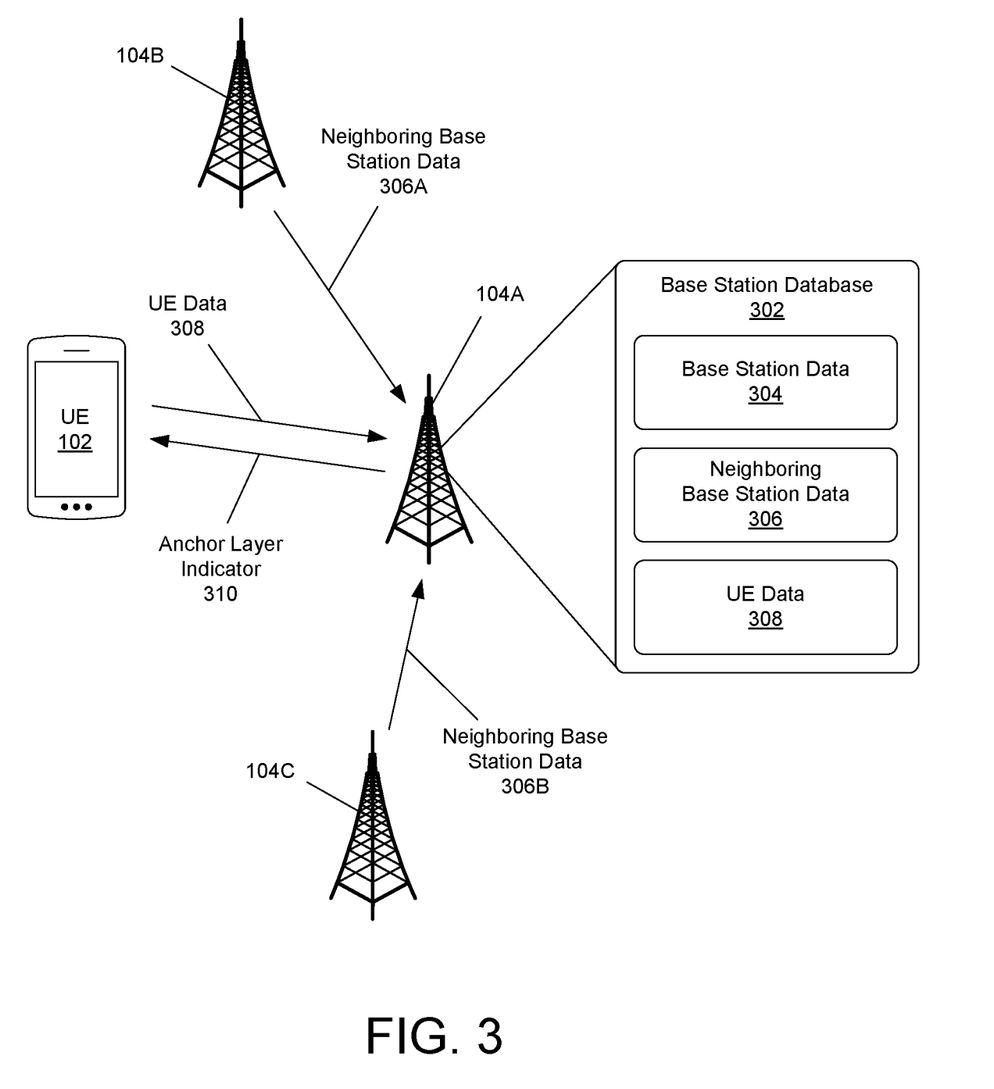
FIG. 3 depicts information that can be maintained by a base station and/or be shared between the base station, neighboring base stations, and/or a UE.

FIG. 3 depicts information that can be maintained by a base station 104 and/or be shared between the base station 104, neighboring base stations 104, and/or a UE 102. For example, a base station 104 can access or maintain a base station database 302 that contains base station data 304, neighboring base station data 306, and/or UE data 308.

The base station data 304 can include information about the base station 104 itself, including identifiers of which frequency bands the base station 104 supports. The base station data 304 can also include load information about the base station 104 indicating historical, current, and/or predicted loads on the base station 104 with respect to individual supported frequency bands. For example, the load information can indicate how many total connections to UE 102 the base station 104 can support on individual frequency bands, how many UEs 102 are currently connected to the base station 104 using individual frequency bands, historical data about how many UEs 102 were connected to the base station 104 using individual frequency bands during previous time periods, predicted data based on historical trends about how many UEs 102 are expected to connect to the base station 104 using individual frequency bands during future time periods, and/or any other type of load information about the base station 104 and/or connections on frequency bands supported by the base station 104. In some examples, load information can also indicate information about available computing resources of the base station 104, such as available processor cycles or memory for data storage.

The neighboring base station data 306 can be similar to the base station data 304, and include similar types of information about one or more neighboring base stations 104 such as which frequency bands individual neighboring base stations 104 support, and/or load information about the neighboring base stations 104. Accordingly, a base station 104 can use neighboring base station data 306 to identify frequency bands of cells operated by other nearby base stations 104 and/or load information associated with those cells.

A base station 104 can receive neighboring base station data 306 from neighboring base stations 104 directly, and/or receive neighboring base station data 306 from a network operator or any other entity. For example, neighboring base stations 104 can be linked together in some telecommunication networks using X2 interfaces or other types of connections. Accordingly, in some examples, a base station 104 can obtain neighboring base station data 306 from a neighboring base station 104 over an X2 interface or other type of connection. In some examples, a base station 104 can use such a connection to request neighboring base station data 306 from a neighboring base station 104. In other examples, a base station 104 can occasionally or periodically transmit its own base station data 304 to neighboring base stations 104, with or without being specifically requested to do so, such that its base station data 304 can be stored as neighboring base station data 306 in base station databases 302 of those neighboring base stations 104. In still other examples, a network operator or other entity can configure a base station 104 by uploading neighboring base station data 306 about nearby base stations 104 to the base station's base station database 302.

In some examples, a base station 104 can infer load levels or other types of neighboring base station data 306 about one or more neighboring base station 104 from other types of data accessible by the base station 104. For example, the base station 104 can receive dynamic spectrum sharing (DSS) information about different portions of a shared spectrum band that a neighboring base station 104 is currently using for LTE and for 5G. For example, a B2 LTE band and an n2 5G NR band can both use the same range of frequencies, but DSS information can indicate how much of that shared range of frequencies a base station 104 is using for LTE services and how much is being used for 5G services. Accordingly, a base station 104 can use DSS information to at least indirectly infer current load levels on different frequency bands used by a neighboring base station 104. For example, because DSS information may indicate that the percentage of the shared spectrum used for LTE by a neighboring base station 104 has decreased over time in favor of the neighboring base station 104 devoting more of that shared spectrum to 5G, the change in the DSS information may at least indirectly indicate that there is more of a load on the neighboring base station 104 in a 5G frequency band than a corresponding LTE frequency band.

A base station 104 can also store UE data 308 about a UE 102 in the base station database 302. UE data 308 can indicate one or more frequency bands that the UE 102 supports. In some examples, the UE data 308 can also indicate whether the UE 102 supports dual connection arrangements, and/or which combinations of frequency bands the UE 102 is configured to use during dual connection arrangements. In some examples, the UE data 308 can also indicate how many connections a UE 102 can support simultaneously within a frequency band, such as whether antennas of the UE 102 support 2×2 multiple input, multiple output (MIMO) connections, 4×4 MIMO connections, or any other arrangement of simultaneous connections. In some examples, the UE data 308 can identify radio bearers, if any, that have been set up in the telecommunication network for a UE 102 through the base station 104 or a neighboring base station 104. As discussed above, one or more bearers may be set up for a UE 102 in the telecommunication network when the UE 102 is in an RRC connected state, but be released when the UE 102 returns to an RRC idle state. In some examples, the UE data 308 can indicate other types of information about a UE 102, such as a device type of the UE 102, a Quality of Service (QoS) associated with the UE 102, a specific type of service or class of services that the UE 102 is using or requesting, and/or any other information about the UE 102.

In some examples, a UE 102 can send some types of UE data 308 to a base station 104 within a message sent by the UE 102 to the base station 104. For example, a UE 102 can directly include some types of UE data 308 in an RRC message that the UE 102 sends to a base station 108, such as an RRC connection request, an RRC connection setup complete message, an RRC connection reconfiguration complete message, or an RRC connection release complete message, or any other RRC message. In other examples, a UE 102 can send UE data 308 to a base station 104 in any other type of message.

In some examples, a base station 104 can also discover and/or infer one or more types of UE data 308 about a UE 102 based on analyzing upstream and/or downstream data that is passing through the base station 104. For example, a base station 104 can analyze data packets associated with a UE 102 to find a QoS Class Identifier (QCI) value or 5G QoS Indicator (5QI) value associated with a flow for the UE 102. Certain QCI values or 5QI values may be associated with certain types of services, such as voice services, video services, low latency services, and/or other types of services. Additionally, certain QCI values or 5QI values may be associated with services more commonly used by some types of IoT devices, while other QCI values or 5QI values are associated with services more commonly used by smartphones or other types of devices. For example, a QCI value of 1 may indicate that a flow is for voice services, while a QCI value of 80 may indicate that a flow is for an enhanced Mobile Broadband (eMBB) or Ultra Reliable Low Latency Communications (URLLC) service and/or device. Accordingly, in some examples, a base station 104 can determine types of services being used by a UE 102 based on a QCI value or 5QI value in upstream or downstream packets, and/or use such service types to identify whether the UE 102 is a certain type of IoT device or another type of device. The base station 104 can store such inferred UE data 308 about the UE 102 in the base station database 302.

As another example, different network slices may be used in 5G networks for different services. Accordingly, a 5G gNB can be configured to identify certain services being used by a UE 102 based on the network slices that the UE 102 is using. If the 5G gNB determines from a network slice associated with a UE 102 that the UE 102 is using services normally associated with a particular device type, such as a type of IoT device, the 5G gNB may also be able to infer the device type of the UE 102. The 5G gNB can store UE data 308 determined from network slice information in the base station database 302.

As another example, a base station 104 can determine services and/or a device type associated with a UE 102 based on radio bearers that have been set up in the telecommunication network for the UE 102. For example, if a dedicated bearer has been set up through the base station 104 for a UE 102, the base station 104 can determine a type of service associated with the bearer and thus the UE 102. In some cases, a split bearer may have been established with a first leg passing through one base station 104 and a second leg passing through another base station 104. The base station 104 can store UE data 308 determined from bearer information in the base station database 302.

A base station 104 can use one or more of the base station data 304, the neighboring base station data 306, and the UE data 308 to select an anchor layer for a UE 102 to camp on. The anchor layer selected by the base station 104 can be a frequency band associated with the base station 104 itself, or a frequency band associated with a neighboring base station 104. The base station 104 can send an anchor layer indicator 310 to the UE 102 that identifies the anchor layer that the base station 104 has selected for the UE 102. If the UE 102 is not already camped on the anchor layer identified by the anchor layer indicator 310, the UE 102 can move to camp on the anchor layer identified by the anchor layer indicator 310.

As an example, a UE 102 may have initially camped on a cell operated by a base station 104 using a first anchor layer. However, the base station 104 can, based on base station data 304, neighboring base station data 306, and/or UE data 308, determine that a second anchor layer associated with the base station 104, or a neighboring base station 104, would provide a better experience for the UE 102 than the first anchor layer. The base station 104 can accordingly send an anchor layer indicator 310 to the UE 102 that identifies the second anchor layer, and the UE 102 can respond by switching to connect on, and/or camp on, the second anchor layer.

In some examples, a base station 104 can select an anchor layer for a UE 102 and/or send an anchor layer indicator 310 to the UE 102 while the UE 102 in a connected mode, such as an RRC connected mode, and is actively engaged in a communication session via the base station 104. In this situation in which the UE 102 is connected to the base station 104 during an active communication session, the base station 104 can send a message, such as a handover or redirect message, to the UE 102 that includes an anchor layer indicator 310 to indicate an anchor layer selected by the base station 104. The UE 102 can then, while still in the connected state, switch to connecting to a cell using the anchor layer identified by the anchor layer indicator 310 in the handover or redirect message. In other examples, the base station 104 can send the anchor layer indicator 310 in an RRC reconfiguration message or other type of message.

In other examples, a base station 104 can select an anchor layer for a UE 102 and/or send an anchor layer indicator 310 to the UE 102 when the UE has left, or is leaving, a connected mode and is returning to an idle mode. For example, when a UE 102 has been engaged in a communication session via a base station 104 and the communication session ends, the base station 104 can send an RRC connection release message to the UE 102, and the UE 102 can move from an RRC connected state to an RRC idle state. The base station 104 can include an anchor layer indicator 310 in the RRC connection release message to the UE 102 that identifies an anchor layer selected by the base station 104 for the UE 102. For example, the base station 104 can include an anchor layer indicator 310 in a "redirectedCarrierInfo" data element, or other data element, of an RRC connection release message. The UE 102 can, after moving to the RRC idle state, switch to camping on the anchor layer identified by the anchor layer indicator 310 in the RRC connection release message. The UE 102 can thereafter use the new anchor layer when it begins its next communication session and returns to the RRC connected state. Accordingly, the UE 102 can use an anchor layer indicator 310 provided by a base station 104 to camp on an anchor layer selected by that base station 104, even when the UE 102 is in an idle state and is not in active communications with the base station 104.

Overall, the base station 104 can select an anchor layer for a UE 102 that the base station determines or predicts, based on the base station data 304, the neighboring base station data 306, and/or the UE data 308, will best meet an experience goal for the UE 102. In some examples, the experience goal can be a highest throughput to the UE 102. The highest throughput can be determined based on an expected or maximum throughput when using a selected anchor layer alone, when using carrier aggregation using the selected anchor layer with or without other frequency bands, and/or when using a dual connection with a first leg via the selected anchor layer and a second leg via the anchor layer or a different frequency band. In other examples, the experience goal can be a lowest latency for a connection to the UE 102, a highest coverage availability for the UE 102, and/or a highest consistency of a connection to the UE 102. In still other examples, the experience goal can be associated with any other metric.

In some examples, the base station 104 can have a default experience goal that the base station 104 uses to select an anchor layer for a UE 102 unless UE data 308 for the UE 102 identifies a service type or device type that the base station 104 associates with a different experience goal. For example, the base station 104 can be configured to, by default, select an anchor layer that can, either alone or in combination with another frequency band, maximize throughput to a UE 102. However, as an example, if device type information in the UE data 308 indicates that a UE 102 is a sensor or other IoT device, such as a massive Machine Type Communications (mMTC) device, that does not generally transmit large amounts of data and may thereby have a better experience when using a low band that can provide a more reliable or consistent connection at greater distances away from a base station 104 than a mid-band or a high band, the base station 104 can be configured to select a low band as the anchor layer for the UE 102 even if mid-bands and/or high bands are also available to be selected as the anchor layer for the UE 102.

The base station 104 can select an anchor layer based on which frequency band the base station data 304, neighboring base station data 306, and/or UE data 308 indicates will best meet an experience goal for the UE 102. As a first example, if a base station 104 supports frequencies in a B41 band and a B2 band, but the base station 104 currently has a high number of connections via the B41 band and a lower number of connections via the B2 band, the base station 104 may determine that the UE 102 will be more likely to achieve an experience goal associated with throughput and/or connection consistency if the UE 102 camps on a cell of the base station 104 using the less-congested B2 band as an anchor layer. Accordingly, the base station 104 can send the UE 102 an anchor layer indicator 310 instructing the UE 102 to connect on, or camp on, the B2 band.

As another example, a UE 102 may be connected to a particular base station 104 using a first frequency band as an anchor layer. However, the particular base station 104 may determine from neighboring base station data 306 and UE data 308 that a nearby neighboring base station 104 supports a second frequency band that a UE 102 also supports. If the particular base station 104 determines from the neighboring base station data 306 that the neighboring base station 104 is less congested on the second frequency band than the particular base station 104 is on the first frequency band, the particular base station 104 can determine that the UE 102 will be more likely to achieve an experience goal associated with throughput and/or connection consistency if the UE 102 camps on a cell of the neighboring base station 104 using the less-congested second frequency band as an anchor layer. Accordingly, the particular base station 104 can send the UE 102 an anchor layer indicator 310 instructing the UE 102 to connect to, or camp on, the neighboring base station 104 using the second frequency band. In some examples, the anchor layer indicator 310 or other data sent by the base station may include a cell identifier, base station identifier, or other data that can assist the UE 102 in locating or identifying the neighboring base station 104 associated with the selected anchor layer, in addition to identifying the selected anchor layer.

As another example, a UE 102 may be connected to a 5G gNB in a 5G standalone mode using a certain frequency band as an anchor layer that provides a throughput to the UE 102 of X Megabits per second (Mbps). The 5G gNB may determine from neighboring base station data 306 and UE data 308 that a nearby LTE eNB uses another frequency band that the UE 102 also supports that can provide a throughput to the UE 102 of Y Mbps. In this situation, the 5G gNB may determine that if UE 102 camped on a certain anchor layer, the UE 102 could connect use an EN-DC dual connection arrangement via both the 5G gNB and the LTE eNB to thereby achieve a total throughput of up to X+Y Mbps. In this situation, the 5G gNB can send the UE 102 an anchor layer indicator 310 instructing the UE 102 to camp on that anchor layer and thereby enable achieving a higher throughput in combination with a second connection. For example, the 5G gNB can send a message to the UE 102 releasing it from the current 5G standalone connection and instructing it to instead connect via a non-standalone connection using both the 5G gNB and the LTE eNB.

As yet another example, a UE 102 may be connected to a base station 104 using one or more carriers in an anchor layer selected by the UE 102. However, if the base station 104 determines that throughput to the UE 102 could be improved by using carrier aggregation through carriers in one or more frequency bands, the base station 104 can send an anchor layer indicator 310 instructing the UE 102 to connect on, or camp on, carriers in at least an anchor layer selected by the base station 104.

As still another example, a base station 104 can review radio bearers set up in the telecommunication network through the base station 104 for the UE 102. If the bearers are associated with certain services, or identify how the UE 102 is connecting to receive services, the base station 104 can select an anchor layer for the UE 102 based on the bearer information.

For instance, a UE 102 may support EN-DC connections on either a first combination of B66 and n260 bands or a second combination of B41 and n41 bands. The UE 102 may have initially chosen to camp on the B66 band as an anchor layer to an LTE eNB, and later initiated a communication session using the B66 band. If, at a later time when the communication session is released, the LTE eNB determines from bearer information that a split bearer had been established for the UE 102 such that the UE 102 was connected through the LTE eNB using a first leg of a split bearer and also through a second leg of the split bearer through an n260 band connection with a 5G gNB, the LTE eNB can determine that the UE 102 should continue to use the B66 band as an anchor layer because that anchor layer allows the UE 102 to also access the n260 mmW band for the 5G leg and in turn achieve higher throughput overall.

Figure 4:
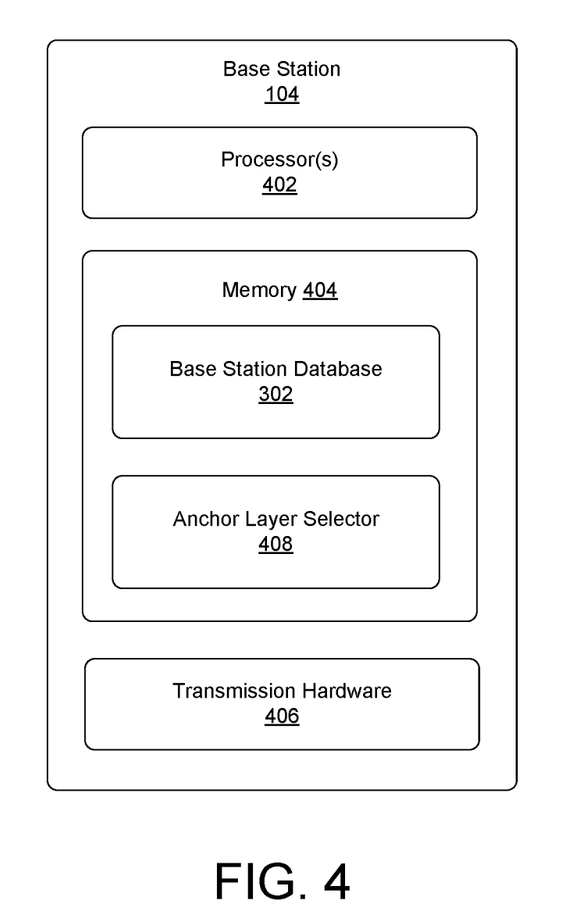
FIG. 4 depicts an example system architecture for a base station.

However, if the LTE eNB determines from bearer information that no 5G NR leg of a split bearer was present when the call is released, the lack of a 5G NR leg of a split bearer can indicate that the UE 102 could not establish connection to a cell via the n260 band, possibly because the UE 102 was too far away from a 5G gNB to use a mmW band to connect to the 5G gNB. Accordingly, the LTE eNB may determine that the UE 102 should instead camp on the B41 band as its anchor layer because the B41 band can provide a higher throughput than the B66 band alone, and/or because camping on the B41 band may be more likely to allow the UE 102 to also dual connect to a 5G gNB using a n41 mid-band. For instance, even if the UE 102 had not been within range of a 5G gNB using an n260 mmW band, the UE 102 may still be able to dual connect to a 5G gNB using an n41 mid-band, as the n41 mid-band can have a larger range than the n260 mmW band as shown in FIG. 2. Accordingly, when the communication session ends, the base station 104 can send an anchor layer indicator 310, for instance in an RRC connection release message, instructing the UE 102 camp on the B41 band. Example Architecture FIG. 4 depicts an example system architecture for a base station 104, in accordance with various examples. In some examples, the base station 104 can be an LTE base station, such as an eNB. In other examples, the base station 104 can be a 5G base station, such as a gNB. As shown, the base station 104 can include processor(s) 402, memory 404, and transmission hardware 406. The memory 404 can store computer-readable instructions and/or other data associated with the base station database 302, an anchor layer selector 408, and/or operations of the base station 104.

In various examples, the processor(s) 402 can be a central processing unit (CPU), a graphics processing unit (GPU), both CPU and GPU, or any other type of processing unit. Each of the one or more processor(s) 402 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 402 may also be responsible for executing all computer applications stored in the memory 404, which can be associated with common types of volatile (RAM) and/or nonvolatile (ROM) memory.

In various examples, memory 404 can include system memory, which may be volatile (such as RAM), non-volatile (such as ROM, flash memory, etc.) or some combination of the two. The memory 404 can also include additional data storage devices (removable and/or non-removable) such as, for example, magnetic disks, optical disks, or tape. Memory 404 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the base station 104. Any such non-transitory computer-readable media may be part of the base station 104.

The transmission hardware 406 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more UEs 102, other base stations 104, and a core network 106, and can transmit data over such connections. For example, the transmission hardware 406 can establish a connection with a UE 102 over an air interface, a connection with a neighboring base station 104 over an X2 interface, and a connection with a core network 106 over an Si interface. The transmission hardware 406 can also support transmissions using one or more radio access technologies, such as 5G NR or LTE, as discussed above. Additionally, as discussed above, the transmission hardware 406 can support transmissions in one or more frequency bands, including low bands, mid-bands, and/or high bands such as mmW bands.

The base station database 302 can include base station data 304, neighboring base station data 306, and/or UE data 308 as described above with respect to FIG. 3.

The anchor layer selector 408 can be configured to use base station data 304, neighboring base station data 306, and/or UE data 308 from the base station database 302 to select an anchor layer for a UE 102 that best meets an experience goal for the UE 102. As described above, the experience goal can be a highest throughput using the anchor layer alone and/or a dual connection through the anchor layer and another frequency band. In other examples, the experience goal can be a highest consistency connection, a lowest latency connection, a highest coverage availability, or a goal associated with any other metric. In some examples, the anchor layer selector 408 can use machine learning to select, after being trained on historical data about factors associated with different experiences of UEs 102 on different anchor layers, an anchor layer for a UE 102 based on similar factors within the use base station data 304, neighboring base station data 306, and/or UE data 308.

For example, the anchor layer selector 408 can use base station data 304, neighboring base station data 306, and/or UE data 308 to identify which frequency bands the base station 104, neighboring base station 104, and/or a UE 102 supports and are therefore candidates to be selected as an anchor layer. The anchor layer selector 408 can also use UE data 308 to identify services being used by the UE 102 and/or a device type of the UE 102, and use that information to determine which of the candidate frequency bands would allow the UE 102 to best meet the experience goal. In some examples, the base station 104 can use load and/or congestion information in the base station data 304 and/or neighboring base station data 306 to determine, for instance, if a candidate frequency band that might otherwise be selected as the anchor layer is too congested such that another candidate frequency band would be more likely to allow the UE 102 to achieve the experience goal.

The anchor layer selector 408 can also be configured to generate and send an anchor layer indicator 310 to a UE 102 that identifies a selected anchor layer, for instance in an RRC reconfiguration message, an RRC connection release message, a handover message, a redirect message, and/or any other type of message.

Figure 5:
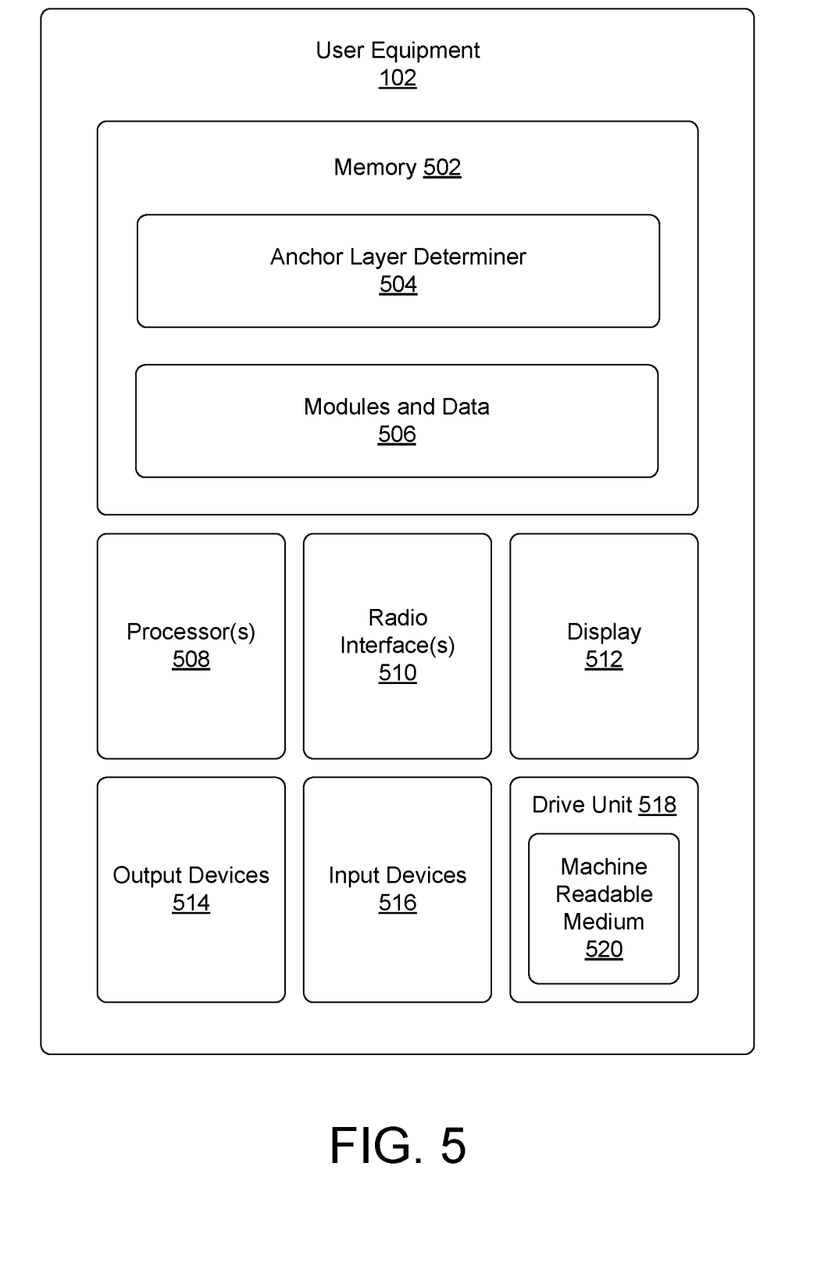
FIG. 5 depicts an example system architecture for a UE.

FIG. 5 depicts an example system architecture for a UE 102, in accordance with various examples. As shown, a UE 102 can have memory 502 storing an anchor layer determiner 504 and other modules and data 506. A UE 102 can also have processor(s) 508, radio interfaces 510, a display 512, output devices 514, input devices 516, and/or a drive unit 518 including a machine readable medium 520.

In various examples, the memory 502 can include system memory, which may be volatile (such as RAM), non-volatile (such as ROM, flash memory, etc.) or some combination of the two. The memory 502 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The anchor layer determiner 504 can be configured to select a frequency band that the UE 102 uses as an anchor layer to connect to and/or camp on a cell operated by a base station 104. In some examples, the anchor layer determiner 504 can be configured to at least initially select a frequency band based on predetermined priority data associated with different frequency bands that the UE 102 supports. However, the anchor layer determiner 504 can be configured to follow an anchor layer indicator 310 received from a base station 104 to instead cause the UE 102 to later connect on, or camp on, a particular frequency band that has been selected by the base station 104.

The other modules and data 506 can be utilized by the UE 102 to perform or enable performing any action taken by the UE 102. The modules and data 506 can include a UE platform, operating system, and applications, and data utilized by the platform, operating system, and applications.

In various examples, the processor(s) 508 can be a central processing unit (CPU), a graphics processing unit (GPU), or both CPU and GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing all computer applications stored in the memory 502, which can be associated with common types of volatile (RAM) and/or nonvolatile (ROM) memory.

The radio interfaces 510 can include transceivers, modems, interfaces, antennas, and/or other components that perform or assist in exchanging radio frequency (RF) communications with base stations 104 of the telecommunication network, a Wi-Fi access point or other access point, and/or otherwise implement connections with one or more networks. For example, the radio interfaces 510 can be compatible with one or more radio access technologies, such as 5G radio access technologies and/or 4G/LTE radio access technologies. The radio interfaces 510 may also be configured to, in some situations, establish dual connections with different base stations 104. Additionally, as discussed above, the radio interfaces 510 can support transmissions in one or more frequency bands, including low bands, mid-bands, and/or high bands such as mmW bands.

The display 512 can be a liquid crystal display or any other type of display commonly used in UEs 102. For example, display 512 may be a touch-sensitive display screen, and can then also act as an input device or keypad, such as for providing a soft-key keyboard, navigation buttons, or any other type of input. The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display. The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions, such as software or firmware, that embodies any one or more of the methodologies or functions described herein. The instructions can also reside, completely or at least partially, within the memory 502, processor(s) 508, and/or radio interface(s) 510 during execution thereof by the UE 102. The memory 502 and the processor(s) 508 also can constitute machine readable media 520.

Example Operations

Figure 6:
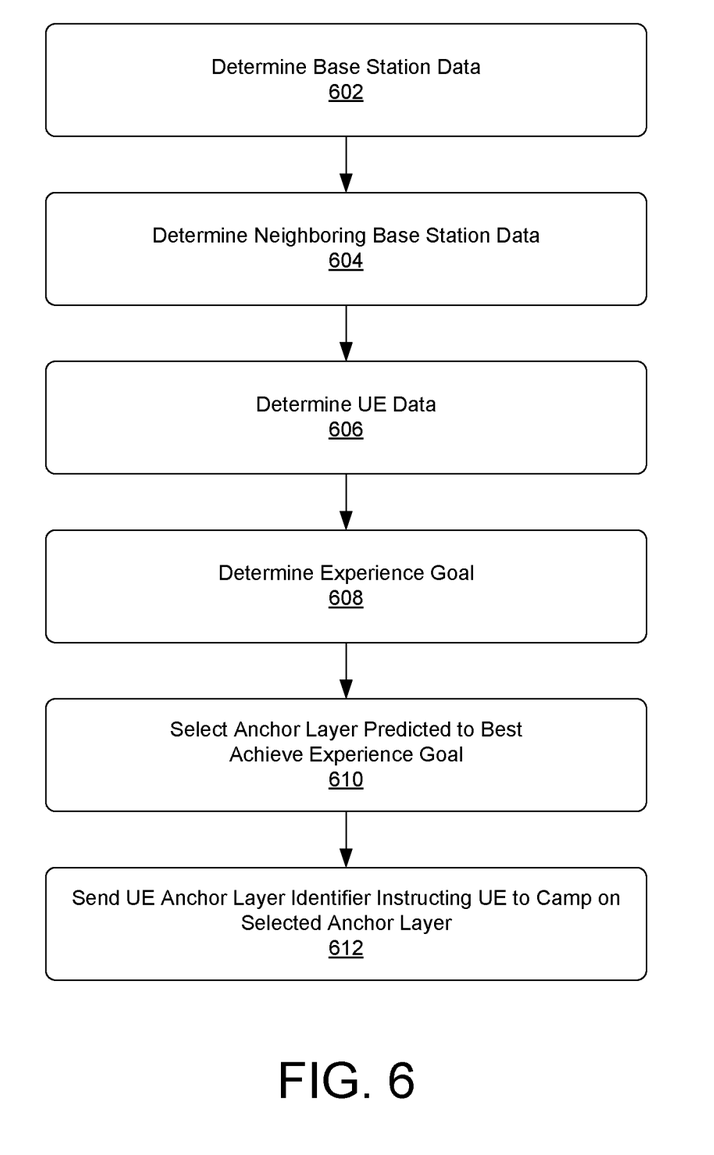
FIG. 6 depicts a flowchart of a first process by which a base station can select an anchor layer for a UE.

FIG. 6 depicts a flowchart of a first process by which a base station 104 can select an anchor layer for a UE 102.

At block 602, the base station 104 can determine base station data 304 about itself. The base station data 304 can identify one or more frequency bands that the base station 104 supports. The base station data 304 can also indicate load information about individual frequency bands that the base station 104 supports.

At block 604, the base station 104 can determine neighboring base station data 306 about neighboring base stations 104, if any. For example, a base station 104 in a particular can be linked via an X2 interface, or other interface, to one or more other base stations 104 located in the area, and can obtain neighboring base station data 306 from those neighboring base stations 104. The neighboring base station data 306 can identify one or more frequency bands that individual neighboring base stations 104 support. The neighboring base station data 306 can also indicate load information about individual frequency bands that the individual neighboring base stations 104 support.

At block 606, the base station 104 can determine UE data 308 about a UE 102. The UE data 308 can indicate which frequency bands the UE 102 supports, which dual connection arrangements the UE 102 supports, and/or how many simultaneous connections within a frequency band the UE 102 can support. The UE data 308 can also identify any radio bearers that have been established for the UE 102 in the telecommunication network, what specific services, service types, or classes of service the UE 102 is using, a device type of the UE 102, and/or any other information. In some examples, the UE 102 can directly send some types of the UE data 308 to the base station 104, for instance in an RRC message or other type of message. In some examples, the base station 104 can also infer some types of UE data 308 by analyzing upstream and/or downstream data associated with the UE 102 and/or reviewing bearer information associated with the UE 102.

At block 608, the base station 104 can determine an experience goal for the UE 102. The experience goal can be to maximize or achieve a highest possible throughput to the UE 102, to achieve a most consistent connection for the UE 102, to achieve a lowest latency for the UE 102, provide a largest coverage area or highest coverage availability for the UE 102 and/or be any other target or goal. In some examples, the base station 104 can select a default experience goal, such as a default experience goal that maximizes throughput to the UE 102, unless the UE data 308 indicates that a device type, service type, or other data about the UE 102 is associated with a different experience goal.

At block 610, the base station 104 can select an anchor layer for the UE that the base station 104 expects or predicts will best allow the UE 102 to achieve the experience goal. For example, the base station 104 can identify candidate anchor bands by using UE data 308 to identify frequency bands that the UE 102 supports and using base station data 304 and/or neighboring base station data 306 to identify which of the UE-supported frequency bands the base station 104 and/or neighboring base stations 104 support. The base station 104 can also use UE data 308 to identify services being used by the UE 102 and/or a device type of the UE 102, and use that information to determine which of the candidate frequency bands would allow the UE 102 to best meet the experience goal. In some examples, the base station 104 can use load and/or congestion information in the base station data 304 and/or neighboring base station data 306 to determine, for instance, if a candidate frequency band that might otherwise be selected as the anchor layer is too congested such that another candidate frequency band would be more likely to allow the UE 102 to achieve the experience goal.

At block 612, the base station 104 can send the UE 102 an anchor layer indicator 310 instructing it to camp on, or connect via, the anchor layer the base station 104 selected during block 610. In some examples, the base station 104 can wait until the UE 102 is finished with a communication session and is returning to an idle mode, and can send the anchor layer indicator 310 in an RRC connection release message such that the UE 102 can follow the anchor layer indicator 310 and camp on the anchor layer selected by the base station when the UE 102 is in an RRC idle state. In other examples, the base station 104 can send the anchor layer indicator 310 in a handover or redirect message while the UE 102 is in an RRC connected state.

Figure 7:
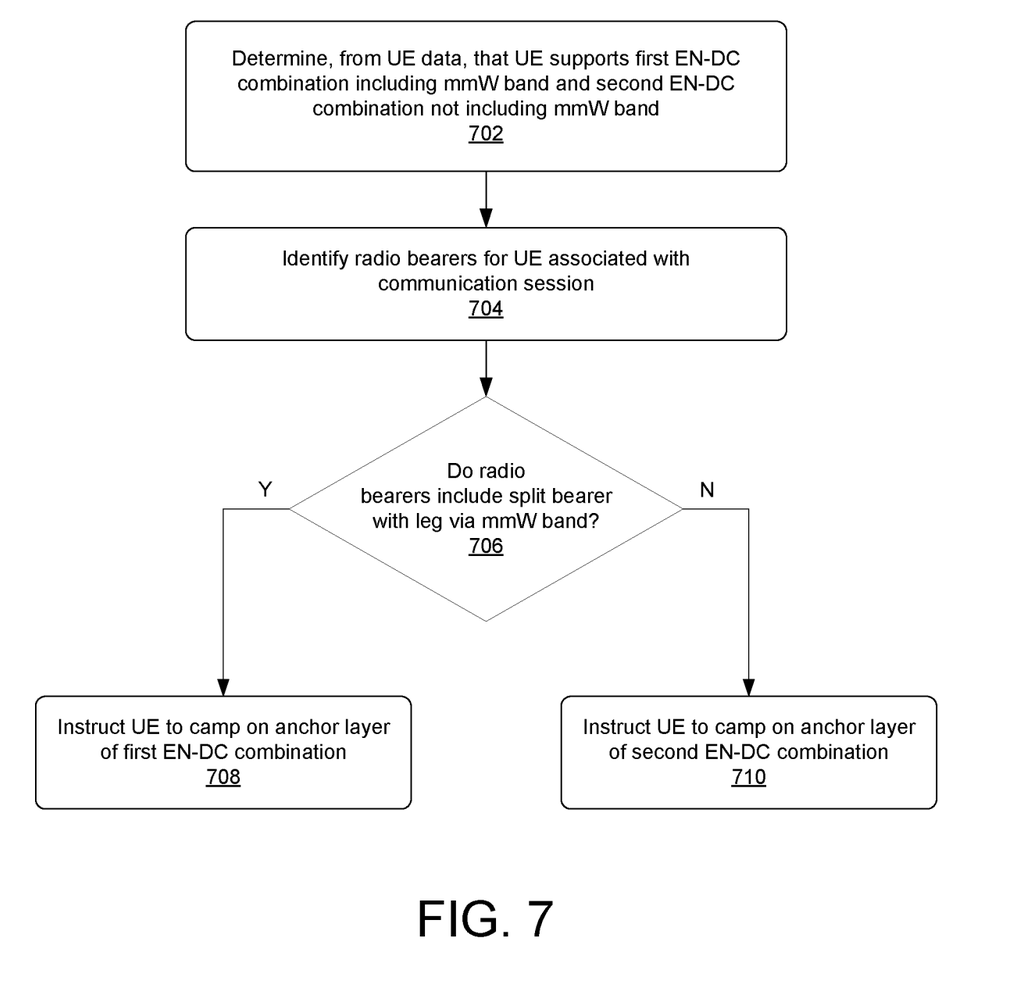
FIG. 7 depicts a flowchart of a second process by which a base station can select an anchor layer for a UE.

FIG. 7 depicts a flowchart of a second process by which a base station 104 can select an anchor layer for a UE 102.

At block 702, the base station 104 can determine from UE data 308 that the UE 102 supports two possible EN-DC combinations. The two EN-DC combinations can include a first EN-DC combination including a first LTE anchor layer and a 5G mmW band, and a second EN-DC combination including a second LTE anchor layer and a 5G non-mmW band. For example, the UE data 308 can indicate the UE 102 supports a first EN-DC combination with an anchor layer connection to an LTE eNB on a B66 band and a second leg connection to a 5G gNB on a mmW n260 band, and a second EN-DC combination with an anchor layer connection to an LTE eNB on a B41 band and a second leg connection to a 5G gNB on an n41 band.

At block 704, the base station 104 can identify radio bearers that have been set up in the telecommunication network for a communication session for the UE 102. For example, when the UE 102 is connected to the base station 104 and is engaged in a communication session in an RRC connected state or is ending the communication session and about to return to an RRC idle state, which radio bearers are in place for the communication session. Such radio bearers can include split bearers with one leg that passes through the base station 104 and another leg that passes through a different base station 104.

At block 706, the base station 104 can determine if the radio bearers for the UE 102 include a split bearer with a second leg passing through a 5G gNB using the mmW band the UE supports. For example, the UE 102 may have initially used the first EN-DC combination to camp on base station 104 using the first LTE anchor layer before beginning the communication session. However, although the first EN-DC combination would allow the UE 102 to also connect via a second leg of a split bearer using a 5G mmW band, the UE 102 may or may not be in range of a cell of a 5G gNB that uses that 5G mmW band. Accordingly, at block 706, the UE 102 can determine if such a split bearer using the 5G mmW band were set up.

If the base station 104 determines that a leg of a split bearer using the 5G mmW band was in place for the UE 102 at block 706, the base station 104 can send an anchor layer indicator 310 to the UE 102 at block 708 indicating that the UE 102 should continue to camp on the first LTE anchor layer associated with the first EN-DC combination supported by the UE 102. The base station 104 may select the first LTE anchor layer associated with the first EN-DC combination, because the maximum throughput the first EN-DC combination can provide exceeds the maximum throughput the second EN-DC combination can provide and the bearer information indicates that the UE 102 is able to connect via both the first LTE anchor layer and the 5G mmW band of the first EN-DC combination. Accordingly, the base station 104 can determine that the first anchor layer of the first EN-DC combination is more likely to allow the UE 102 to achieve an experience goal, such as a maximum possible throughput, lowest latency, highest coverage availability, or other goal, and can instruct the UE 102 to use that first anchor layer in an anchor layer indicator 310 at block 708.

However, if the base station 104 determines that a leg of a split bearer using the 5G mmW band was not in place for the UE 102 at block 706, the base station 104 can send an anchor layer indicator 310 to the UE 102 at block 710 indicating that the UE 102 should instead camp on the second LTE anchor layer associated with the second EN-DC combination supported by the UE 102. Here, the bearer information indicates that the 5G mmW band of the first EN-DC combination was not available to the UE 102, and the base station 104 can determine that the second LTE anchor layer of the second EN-DC combination would better allow the UE 102 to meet an experience goal, such as a maximum throughput, lowest latency, highest coverage availability, or other goal, because throughput using the second LTE anchor layer would exceed the throughput provided by the first LTE anchor layer alone. Camping of the second LTE anchor layer may also allow the UE to connect to a non-mmW 5G band that is available at a greater distance from a 5G gNB than the mmW 5G band, such that the throughput to the UE 102 can be further increased if the UE 102 is in range using the non-mmW 5G band and can use both the second LTE anchor layer and the non-mmW band of the second EN-DC combination. Accordingly, the base station 104 can determine that the second anchor layer of the second EN-DC combination is more likely to allow the UE 102 to achieve an experience goal, such as a maximum possible throughput, lowest latency, highest coverage availability, or other goal, and can instruct the UE 102 to use that second anchor layer in an anchor layer indicator 310 at block 710.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
   determining, by a base station of a telecommunication network, user equipment (UE) data of a UE that is connected to the base station, wherein the UE data indicates a set of frequency bands that the UE supports;
   identifying, by the base station, one or more candidate frequency bands from the set of frequency bands that are also supported by the base station or a neighboring base station;
   determining, by the base station, an experience goal for the UE;
   selecting, by the base station, an anchor layer for the UE from the one or more candidate frequency bands, based on determining which one of the one or more candidate frequency bands will meet the experience goal for the UE; and
   sending, by the base station, an anchor layer indicator to the UE that identifies the anchor layer selected by the base station,
   wherein the base station sends the anchor layer indicator to the UE when the UE is leaving a connected state and is returning to an idle state.

2. The method of claim 1, wherein the UE data further indicates at least one of a device type of the UE, a service the UE is engaged in, or a type of service the UE is engaged in.

3. The method of claim 1, wherein the UE data is received by the base station in a Radio Resource Control (RRC) message from the UE.

4. The method of claim 1, wherein the base station determines the UE data from bearer information about one or more bearers set up for the UE in the telecommunication network.

5. The method of claim 4, wherein:
   the UE data indicates that the UE supports a first dual connectivity arrangement using a first frequency band and a second frequency band that is a millimeter wave band, and a second dual connectivity using a third frequency band and a fourth frequency band,
   the bearer information indicates that a split bearer using the second frequency band as a second leg is not in place for the UE in the telecommunication network, and
   the base station selects the third frequency band as the anchor layer for the UE based on the second frequency band not being used in the split bearer.

6. The method of claim 1, wherein the base station determines the UE data by analyzing upstream or downstream data associated with the UE that is passing through the base station.

7. The method of claim 1, wherein the base station determines the UE data by identifying a network slice associated with the UE.

8. The method of claim 1, further comprising identifying, by the base station, load levels on the one or more candidate frequency bands at the base station or the neighboring base station, wherein the base station selects the anchor layer for the UE at least in part based on the load levels.

9. The method of claim 1, wherein the experience goal is at least one of a highest throughput to the UE, a lowest latency for the UE, a highest coverage availability for the UE, or a highest consistency of connection to the UE.

10. The method of claim 1, wherein the base station sends the anchor layer indicator to the UE while the UE is in a connected state associated with the base station.

11. A base station comprising:
    one or more processors;
    memory storing computer-executable instructions that, when executed by the one or more processors, cause the base station to perform operations comprising:
      determining, from bearer information about one or more bearers set up in a telecommunication network for a user equipment (UE) that is connected to the base station, UE data of the UE,
        wherein the UE data indicates a set of frequency bands that the UE supports and indicates that the UE supports a first dual connectivity arrangement using a first frequency band and a second frequency band that is a millimeter wave band and a second dual connectivity using a third frequency band and a fourth frequency band, and
        wherein the bearer information indicates that a split bearer using the second frequency band as a second leg is not in place for the UE in the telecommunication network;

identifying one or more candidate frequency bands from the set of frequency bands that are also supported by the base station or a neighboring base station;

determining an experience goal for the UE;

selecting an anchor layer for the UE from the one or more candidate frequency bands, based on determining which one of the one or more candidate frequency bands will meet the experience goal for the UE, wherein the base station selects the third frequency band as the anchor layer for the UE based on the second frequency band not being used in the split bearer; and sending an anchor layer indicator to the UE that identifies the anchor layer selected by the base station.

12. The base station of claim 11, wherein the UE data further indicates at least one of a device type of the UE, a service the UE is engaged in, or a type of service the UE is engaged in.

13. The base station of claim 11, wherein the experience goal is at least one of a highest throughput to the UE, a lowest latency for the UE, a highest coverage availability for the UE, or a more reliable or consistent connection to the UE.

14. The base station of claim 11, wherein the base station sends the anchor layer indicator to the UE while the UE is in a connected state associated with the base station.

15. The base station of claim 11, wherein the base station sends the anchor layer indicator to the UE when the UE is leaving a connected state and is returning to an idle state.

16. One or more non-transitory computer-readable media storing computer-executable instructions that, when executed by one or more processors of a base station of a telecommunication network, cause the base station to perform operations comprising:

determining user equipment (UE) data of a UE that is connected to the base station, wherein the UE data indicates a set of frequency bands that the UE supports;

identifying one or more candidate frequency bands from the set of frequency bands that are also supported by the base station or a neighboring base station;

determining an experience goal for the UE;

selecting an anchor layer for the UE from the one or more candidate frequency bands, based on determining which one of the one or more candidate frequency bands will meet the experience goal for the UE; and sending an anchor layer indicator to the UE that identifies the anchor layer selected by the base station, wherein the base station sends the anchor layer indicator to the UE when the UE is leaving a connected state and is returning to an idle state.

17. The one or more non-transitory computer-readable media of claim 16, wherein the UE data further indicates at least one of a device type of the UE, a service the UE is engaged in, or a type of service the UE is engaged in.

18. The one or more non-transitory computer-readable media of claim 16, wherein the experience goal is at least one of a highest throughput to the UE, a lowest latency for the UE, a highest coverage availability for the UE, or a highest consistency of most consistent connection to the UE.

* * * * *